(12) United States Patent
Tavares

(10) Patent No.: US 7,356,168 B2
(45) Date of Patent: Apr. 8, 2008

(54) BIOMETRIC VERIFICATION SYSTEM AND METHOD UTILIZING A DATA CLASSIFIER AND FUSION MODEL

(75) Inventor: Clifford Tavares, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 742 days.

(21) Appl. No.: 10/831,374

(22) Filed: Apr. 23, 2004

(65) Prior Publication Data

US 2005/0238207 A1     Oct. 27, 2005

(51) Int. Cl.
*G06K 9/00* (2006.01)
(52) U.S. Cl. .................................. 382/115
(58) Field of Classification Search ............... None
See application file for complete search history.

(56) References Cited

U.S. PATENT DOCUMENTS 5,502,774 A * 3/1996 Bellegarda et al. ......... 382/159

OTHER PUBLICATIONS

Kalyan Veeramachaneni, et al., "Adaptive Multimodal Biometric Fusion Algorithm Using Particle Swarm," Paper from Department of Electrical Engineering and Computer Science, Syracuse University, Syracuse, NY 13244-1240, 11 pages, 2003.
Arun Ross, et al., "Information Fusion in Biometrics," Paper appeared in Proc. of 3rd Int'l Conference on Audio- and Video-Based person Authentication (AVBPA), pp. 354-359, Sweden, Jun. 6-8, 2001.
Weicheng Shen, et al., "Automated Biometrics-Based Personal Identification," Paper appeared in Proc. Natl. Acad. Sci. USA, vol. 98, pp. 11065-11066, Sep. 1999.
Resonance Publications, "Biometric Glossary," Apr. 13, 2004, 15 pages url:http://www.resonancepub.com/biometricgl.htm.
Anil Jain, Arun Ross, Salil Prabhakar, "Fingerprint Matching Using Minutiae and Texture Features," Oct. 7-10, 2001, pp. 282-285, Appeared in Proc. of Int'l Conference on Image Processing (ICIP) Thessaloniki, Greece.
Josef Bigun, et al., "Multimodal Biometric Authentication Using Quality Signals in Mobile Communications," Sep. 17-19, 2003, pp. 2-11, IEEE-Comuter Society Press, (Proc. of 12th Int. Conf. on image analysis and processing, Mantova, Italy).

* cited by examiner

*Primary Examiner*—Matthew C. Bella
*Assistant Examiner*—Alex Liew
(74) *Attorney, Agent, or Firm*—Squire Sanders & Dempsey, LLP

(57) ABSTRACT

A biometric verification system and methods for using thereof are disclosed. The biometric verification system may comprise a verification engine for verifying an identity of a subject and a training engine. The verification engine may comprise a plurality of discriminators, a discriminator fusion component, and a subset fusion component. The discriminators analyze biometric inputs to generate a plurality of distortion scores. The discriminator fusion component analyzes the distortion scores utilizing a plurality of reference user models and a discriminator reliability ranking to obtain a combined confidence score for biometric sets of the subject in question. The subset fusion component analyzes the distortion scores for a plurality of biometric subsets utilizing subset selection criteria to generate a combined confidence score for the biometric subsets of a subject in question. The verification engine may also include logic capable of determining whether to accept the subject in question as a genuine subject based on the combined confidence scores.

15 Claims, 9 Drawing Sheets

BIOMETRIC VERIFICATION SYSTEM AND METHOD UTILIZING A DATA CLASSIFIER AND FUSION MODEL

BACKGROUND

1. Technical Field

This invention relates generally to biometrics, and more particularly to biometric verification systems for confirming the identity of a user.

2. Description of Background Art

Biometrics is the science and technology of measuring and statistically analyzing biological data. A biometric is a measurable, physical characteristic or personal behavioral trait used to recognize the identity, or verify the claimed identity, of an enrollee. In general, Biometrics statistically measure certain human anatomical and physiological traits that are unique to an individual. Examples of biometrics include fingerprints, retinal scans, speaker recognition, signature recognition, hand recognition and others.

Verification (also known as authentication) is a process of verifying the user is who they claim to be. A goal of biometric verification is to determine if the user is the authentic enrolled user or an impostor. Generally, biometric verification includes four parts: 1) capture human input, 2) filter out unwanted input such as noise, 3) generate a statistical representation of the biometric input (referred to as a template), and 4) perform a match against biometric information previously gathered and stored during an enrollment procedure.

A multimodal biometric system uses multiple applications to capture different types of biometrics. This allows the integration of two or more types of biometric recognition and verification systems in order to meet stringent performance requirements. A process called fusion may be used to integrate biometrics in a multimodal biometric system. An example of a multimodal system may include a combination of fingerprint verification, face recognition, and voice verification. Multimodal biometric systems may be used to take advantage of the proficiency of each individual biometric and help overcome some of the limitations of a single biometric.

SUMMARY

Embodiments of a biometric verification system and methods of use are disclosed. The biometric verification system may include a verification engine for verifying an identity of a subject and a training engine.

The verification engine may comprise a plurality of discriminators, a discriminator fusion component, and a subset fusion component. The discriminators may be capable of analyzing biometric inputs for a plurality of biometric sets of a subject in question to generate a plurality of distortion scores. Each biometric set in the biometric input may be analyzed by a separate discriminator so that a portion of the distortion scores is associated with each biometric set. The discriminator fusion component may be capable of analyzing the distortion scores to obtain a combined confidence score for the biometric sets of the subject in question. The discriminator fusion component may perform its analysis of the distortion scores using a plurality of reference user models and a reliability ranking of the discriminators. The subset fusion component may be capable of analyzing the distortion scores generated by a discriminator for a plurality of biometric subsets utilizing subset selection criteria to generate a combined confidence score for biometric subsets of the subject in question. The verification engine may also include logic capable of determining whether to accept the subject in question as a genuine subject based on the combined confidence scores.

The training engine may be adapted to train the discriminators and may include training data, a score analyzer, a subset priority analyzer, and a model analyzer. The training data may comprise data of a biometric set that includes a plurality of biometric subsets. The discriminator may analyze the training data to generate a plurality of training distortion scores, with a portion of the training distortion scores associated with each biometric subset. The score analyzer may be adapted for analyzing the training distortion scores to generate reference user models for each of the biometric subsets and the biometric set of the discriminator. The subset priority analyzer may be adapted for analyzing the training distortion scores and reference user models generated by the score analyzer to develop subset selection criteria for the biometric subsets associated with the discriminator. The model analyzer may be adapted for analyzing the reference user models generated by the score analyzer and the subset selection criteria generated by the subset priority analyzer to characterize the reliability of the at least one discriminator.

Each reference user model may have a probability density function for genuine subjects and a probability density function for imposters that define a cumulative probability density function. Also, the probability density functions for genuine subjects and imposters may intersect at a point of indecision and may have overlapping portions adjacent the point of indecision which define a region of indecision.

The biometric verification system may be trained by analyzing training data for a biometric set utilizing a discriminator to generate a plurality of distortion scores. The biometric set may include a plurality of biometric subsets with each of the biometric subsets having a portion of the training data associated therewith so that each biometric subset is associated with a corresponding portion of the distortion scores. The distortion scores may be analyzed to generate reference user models for each of the biometric subsets and the biometric set. The distortion scores and reference user models may be analyzed to develop subset selection criteria for the biometric subsets. The reference user models and the subset selection criteria may also be analyzed to characterize the reliability of the discriminator.

In one embodiment, the reference user module for a biometric set may be a cumulation of the reference user models of all of the biometric subsets associated with the biometric set. Each reference user model may have a probability density function for genuine subjects and a probability density function for imposters that define a cumulative probability density function. The probability density functions for genuine subjects and imposters may intersect at a point of indecision and may have overlapping portions adjacent the point of indecision which define a region of indecision. The reliability of the discriminator may be characterized as a discriminator reliability score that is inversely proportional to the region of indecision. The reliability of the discriminator may be compared to the reliability of one ore more additional discriminators to determine to rank the reliabilities of the discriminators. The analysis of the distortion scores and reference user models may utilize circumstantial data, demographic data, and statistical data to develop subset selection criteria for the biometric subsets.

An identity of a subject may be identified by analyzing biometric inputs of a subject in question utilizing a plurality of discriminators to generate a plurality of distortion scores. The biometric inputs may comprise biometric inputs for a plurality of biometric sets with each discriminator analyzing the biometric inputs of an associated biometric set so that each biometric set may be associated with a corresponding portion of the distortion scores. The distortion scores of the discriminators may be analyzed utilizing a plurality of reference user models and a reliability ranking of the discriminators to obtain a combined confidence score for the biometric sets of the subject in question. Based on the combined confidence score, a determination may be made whether to accept the subject in question as a genuine subject.

The distortion scores of at least one discriminator may be analyzed with regard to a plurality of biometric subsets of the biometric set associated with the at least one discriminator utilizing subset selection criteria in order to combine confidence scores of the biometric subsets of the subject in question. The subset selection criteria may be derived from an analysis of reference user models in view of at least one of: circumstantial data, demographic data, and statistical data. The discriminators may be utilized in an order based on the reliability ranking. The reference user model may comprise a cumulative probability density function for genuine subjects and for imposters that defines a point of indecision and a region of indecision adjacent the point of indecision. The plurality of discriminators may comprise a predetermined number of discriminators associated with a selected security level selected from a set of security levels.

In one embodiment, the analysis of the distortion scores may be performed by calculating an accept score and a reject score for the distortion score of each discriminator using the corresponding reference user model, then determining whether the accept and reject scores for any of the discriminators lie in a region of indecision of the corresponding reference user model. If the accept and reject scores of the discriminator having the highest reliability ranking lies outside the region of indecision of the associated reference user model, the combined confidence score may be calculated by using the difference between the accept and reject scores of the highest reliability ranking discriminator. If, a portion of accept and reject scores lie outside the regions of indecision of the corresponding reference user models, the combined confidence score may be calculated by using the difference between the accept and reject scores of the discriminator having the highest reliability ranking that lies outside the region of indecision of the associated reference user model. If, however, none of the accept and reject scores lie outside the regions of indecision of the corresponding reference user models, the combined confidence score may be calculated by using the difference between the accept and reject scores of the highest reliability ranking discriminator and determining whether the combined confidence score is greater than zero.

DETAILED DESCRIPTION

Figure 1:
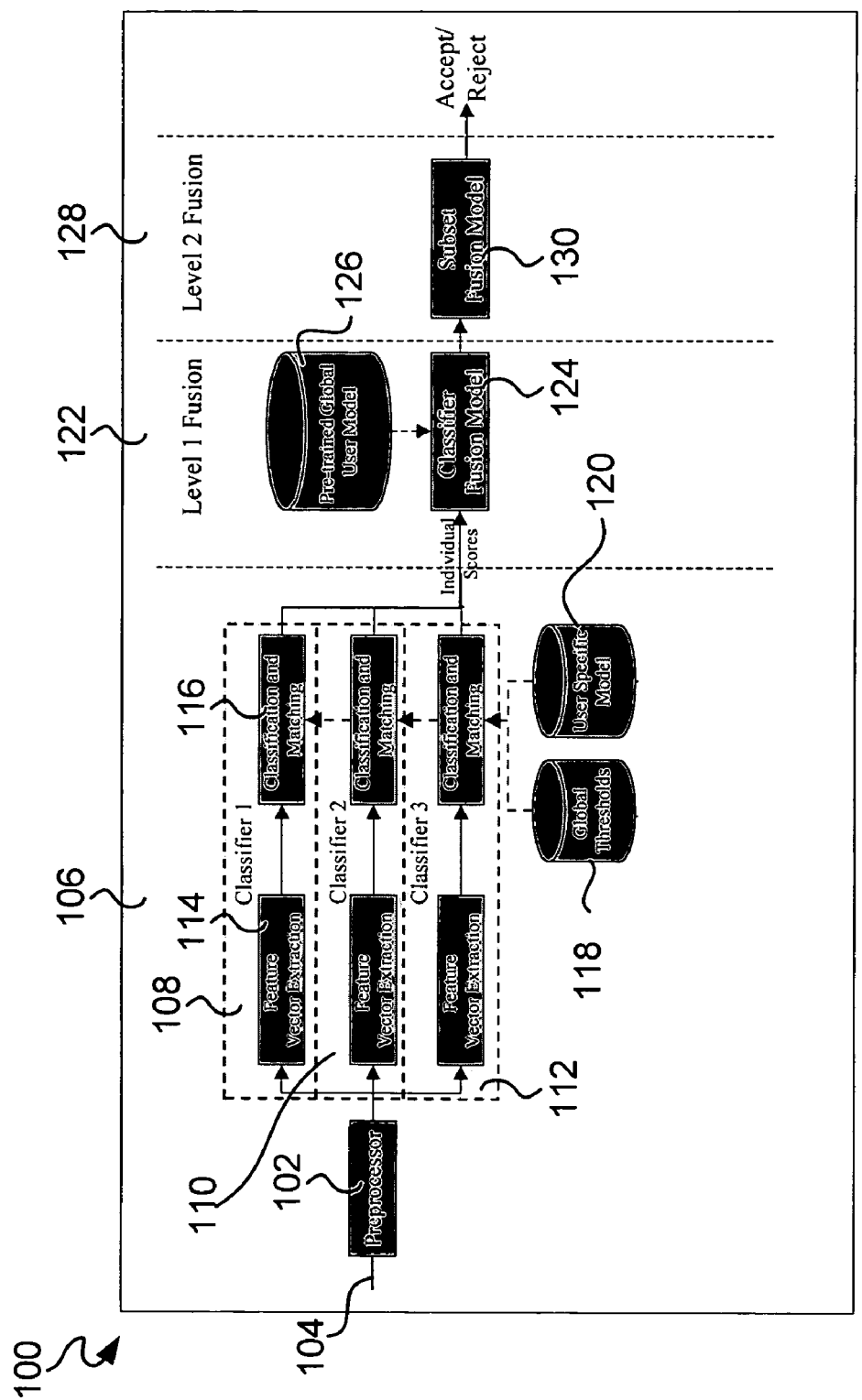
FIG. 1 is a schematic block diagram of an illustrative architecture for a classifier fusion model verification engine in accordance with an exemplary embodiment of the invention.

In the process of biometrics verification, a scheme that uses the outcome of multiple independent (orthogonal or otherwise) discriminators to compute a resultant discrimination score, such that the final score is better than the score of any given discriminator. A 'data classifier' model that uses a process called 'fusion' for constructively combining results of discriminators may execute such a scheme. This scheme may be useful both in single-mode or multi-mode (multi-modal) biometrics. In such a scheme, more than one low complexity discriminators may be used to arrive at separate decisions. Each discriminator may use a global user model and a user specific model for decision-making (and to generate distortion scores). The results of the discriminators may be combined using a "classifier fusion model" where a single final resulting combined confidence score may be better than or equal to individual results of each discriminator. Such an architecture may allow the use of many low complexity discriminators instead of a 'single high complexity discriminator.

Some benefits of using such an architecture may include, for example: reduced overall algorithm complexity, improved accuracy (when used with the fusion mechanism), scalable complexity because the number of discriminators may be increased or reduced, and mechanism to combine multiple biometrics. Compared to traditional implementations of biometrics systems (large and complex), embodiments of the present invention help provide options for implementing low complexity and scalable biometrics security solutions without compromising on accuracy. In addition, with embodiments of the present invention, biometrics security solutions may be built into resource constraint consumer electronics devices (e.g., devices of small size, small processing power, and/or small memory) and, as such, help create new products as well as act as a differentiating feature in existing products. Embodiments of the present invention may further provide options for migrating existing command and control systems (e.g., car automation, voice dialing etc) into secure systems that can be activated by user biometrics where different levels of security may be set for different commands.

Further, embodiments of the present invention may help provide a scheme that allows for combining different biometrics discriminators seamlessly. This may afford two advantages: 1. High security access—because multiple biometrics systems are much more difficult to fool; and 2. Access to people with disability—for example, in cases where a person has a hand bandage (palm print biometrics) or dirty fingers (finger print), voice biometrics may be used to verify the system. In a similar vein, embodiments of the present invention may also provide an interface that allows interfacing with various third party discriminators so that a system may be implemented using discriminators from more than one discriminator vendor.

Embodiments of a data classifier and fusion model biometric verification system (also referred to herein as a "biometric verification system") and methods of use are disclosed. The biometric verification system may include a verification engine for verifying an identity of a subject and a training engine. The training engine or "trainer" may be responsible for analyzing training or reference user (RU) data to generate a genuine user/imposter model. The trainer engine may be invoked once for each biometric subset. Training trains a valid-imposter model based on training RU data. Genuine-user/imposter (reference-user or RU) models generated as a result of training captures the response of each discriminator (also referred herein as a "classifier") when subjected to genuine-user/imposter data. The verification engine or "verifier" may use the RU models to combine the response of each discriminator into a single score or decision by a process of fusion.

Fusion is a process of combining separate scores of each classifier (i.e., each discriminator) using a fusion model. In some embodiments, this may be carried out at run time. Fusion may be carried out in two levels. Level 1 Fusion (referred to herein also as "discriminator fusion") combines the scores or decisions of each discriminator into a single decision or score (i.e., a combined confidence score) such that this decision may be better than individual classifier decisions. Level 2 fusion (referred to herein also as "subset fusion") combines the scores of a plurality of biometric subsets. For example, a 3-digit spoken password (i.e., three biometric subsets) will result in three separate scores. Level 2 fusion combine these three scores into a single combined confidence score.

FIG. 1 is a schematic block diagram of an architecture 100 for a classifier fusion model verification engine in accordance with an exemplary embodiment of the invention. Architecture 100 includes a pre-processor component 102 for receiving biometric input(s) 104 and converting the biometric input into a form usable by biometric applications. Output of the pre-processor component 102 is coupled to a classifier component 106 to permit sending of the converted biometric input from the pre-processor component 102 to the classifier component 106 (referred to herein also as a "discriminator component"). As shown in FIG. 1, architecture 100 may include one or more additional similar pre-processor component/classifier component combinations.

Classifier component 106 may include one or more (i.e., 1 to N) classifier sub-components (e.g., classifier sub-components 108, 110, and 112), with each classifier sub-component comprising a discriminator. Each classifier sub-component 108, 110, 112 comprises a feature vector extraction component 114 and a classification and matching component 116. Feature vector extraction component 114 may be coupled to output of pre-processor component 102 for receiving the converted biometric input from the pre-processor component 102. Feature vector extraction component 114 may be coupled to the classification and matching component 116 to permit it to receive data output from the feature vector extraction component 114.

Global thresholds and user specific model databases 118, 120 may be coupled to the classifier component 106 to permit transfer of data therebetween. More specifically, the classification and matching component 116 of each classifier sub-component 108, 110, 112, may be in communication with the global thresholds and user specific model databases 118, 120 to permit transfer of data therebetween.

Architecture 100 may also include a first level fusion component 122 (referred to herein also as a "discriminator fusion component") coupled to the classifier component 106 for performing a first level of fusion (i.e., "level 1 fusion" or "discriminator fusion"). The first level fusion component 122 may comprise a classifier fusion model component 124 and pre-trained global user model database 126. As shown in FIG. 1, classifier fusion model component 124 may receive scores output by each of the classification and matching components 116 of the classification component 106. Classifier fusion model component 124 may also be coupled to pre-trained global user model database 126 for permitting transfer of data therebetween.

Architecture 100 may further comprise a second level fusion component 128 for performing a second level of fusion ("level 2 fusion"). Second level fusion component 128 may include a subset fusion model component 130 that may be coupled to the classifier fusion model component 124 for receiving data output therefrom.

Training Engine

The training engine may be adapted to train the discriminators. Specifically, the training engine may be adapted for carrying out a process for developing pre-trained reference user models. In one embodiment, training using the training engine may be carried out offline so that at run time, the fusion model verification engine may use the results of the training process.

The training engine may include training data, a score analyzer, a subset priority analyzer, and a model analyzer. The training data may comprise data of a biometric set that includes a plurality of biometric subsets. Typically, the training data is obtained from large databases of biometrics input data.

The discriminator may analyze the training data to generate a plurality of training distortion scores, with a portion of the training distortion scores associated with each biometric subset.

The score analyzer may be adapted for analyzing the training distortion scores to generate reference user models for each of the biometric subsets and the biometric set of the discriminator. Each reference user model may have a probability density function for genuine subjects and a probability density function for imposters that define a cumulative probability density function. Also, the probability density functions for genuine subjects and imposters may intersect at a point of indecision and may have overlapping portions adjacent the point of indecision which define a region of indecision. The generated reference user models may be stored in a reference user model database. As an option, the reference user models may be stored in the reference user database in a compressed data form to help reduce the amount of memory space occupied by the reference user models in the reference user database. As another option, the reference user models may also be encrypted to prevent unauthorized access to them.

The subset priority analyzer may be adapted for analyzing the training distortion scores and reference user models generated by the score analyzer to develop subset selection criteria for the biometric subsets associated with the discriminator. The subset selection criteria may be stored in a subset selection criteria database for storing.

The model analyzer may be adapted for analyzing the reference user models generated by the score analyzer and the subset selection criteria generated by the subset priority analyzer to characterize the reliability of the at least one discriminator.

Figure 2:
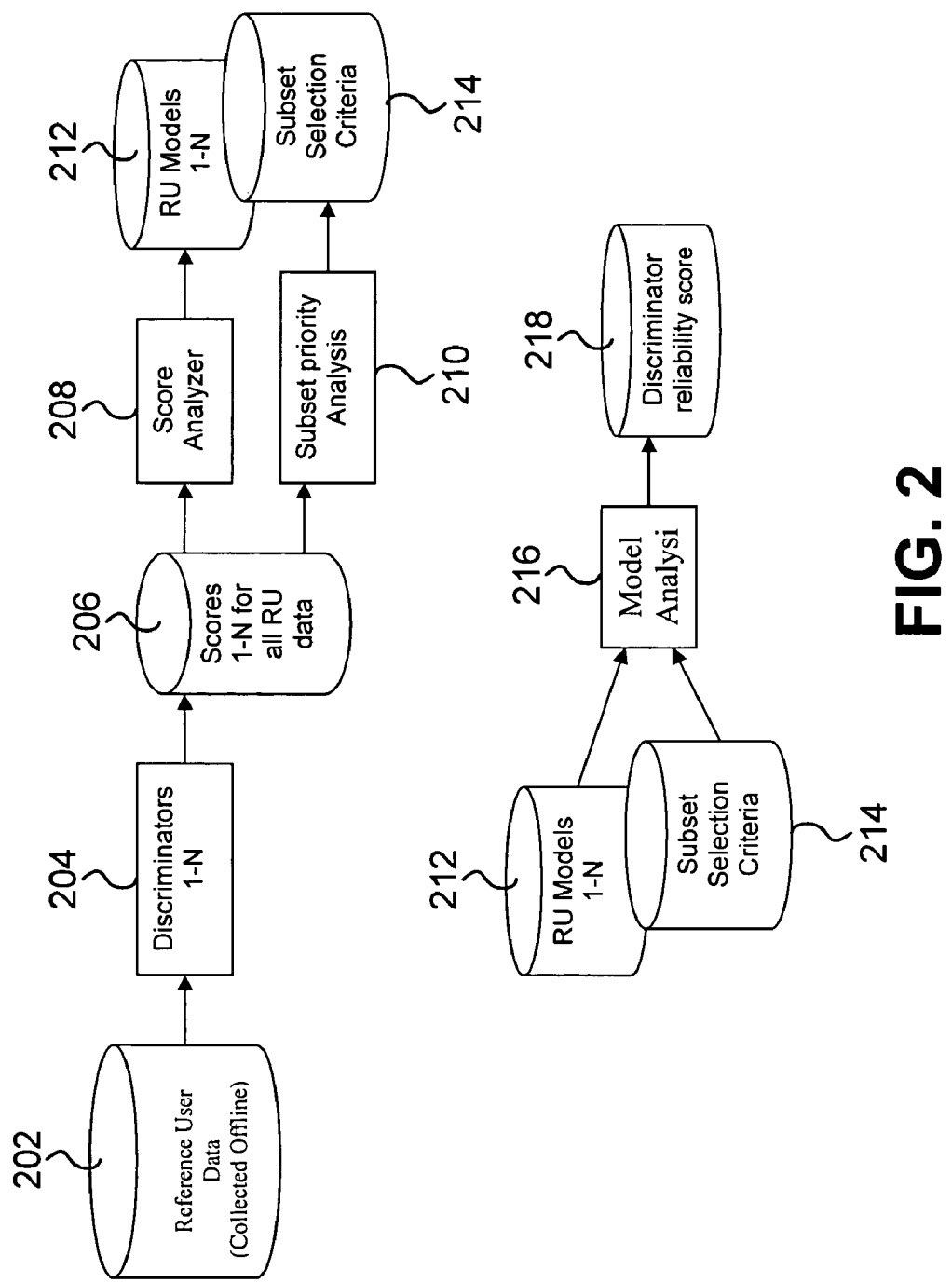
FIG. 2 is a schematic block diagram of an illustrative training engine in accordance with an exemplary embodiment of the invention.

FIG. 2 is a schematic block diagram of a classifier scenario carried out by a training engine in accordance with an exemplary embodiment of the invention. A set of reference user data 202 may be analyzed by one or more (i.e., 1 to N) discriminators 204. Each discriminator 204 may generate a score (referred to herein as a distortion score) that represents the discriminator's analysis of the reference user data 202. The scores generated by the discriminators 204 may be stored in a score database 206. The scores generated by the discriminators 204 may subsequently be subject to analysis by a score analyzer 208 and/or a subset priority analyzer 210.

Score analyzer 208 may perform an analysis on the scores generated by the discriminators 204 to generate a reference user model for each discriminator. In one embodiment, the score analyzer 208 may obtain the scores from the score database 206. The generated reference user models may be stored in a reference user model database coupled to the score analyzer 208.

Subset priority analyzer 210 may perform an analysis on scores generated by the discriminators 204 to generate subset selection criteria for each discriminator 204. In one embodiment, the subset priority analyzer 210 may obtain the scores from the score database 206 and may use the reference user models in its analysis of the scores. The generated subset selection criteria may be stored in a subset selection criteria database 214 coupled to the subset priority analyzer 210.

In one embodiment, a model analyzer 216 may perform a model analysis on the reference user models and the subset selection criteria to generate a discriminator reliability score for each discriminator 204. In one embodiment, the model analyzer 216 may obtain the reference user models from the reference user model database 212 and the subset selection criteria from the subset selection criteria database 214. The generated discriminator reliability scores may be stored in a discriminator reliability score database 218 coupled to the model analyzer 216.

In an exemplary embodiment, the classifier training may be invoked by the following exemplary invocation mechanism:

```
For a given biometric (e.g. iris, voice, lip position)
    For each biometric subset (for voice, digit '1' is a subset, a secret
    password is another subset)
        Retrieve RU data for subset
        Call training unit with subset RU data
    end
end
```

Training Process

The biometric verification system may be trained by analyzing training data for a biometric set utilizing a discriminator to generate a plurality of distortion scores. The training data may include reference user data for known genuine subjects and known imposters. The biometric set may include a plurality of biometric subsets with each of the biometric subsets having a portion of the training data associated therewith so that each biometric subset is associated with a corresponding portion of the distortion scores. The distortion scores may be analyzed to generate reference user models for each of the biometric subsets and the biometric set. The distortion scores and reference user models may be analyzed to develop subset selection criteria for the biometric subsets. The reference user models and the subset selection criteria may also be analyzed to characterize the reliability of the discriminator.

In one embodiment, the reference user module for a given biometric set may be a cumulation (either a sum or product) of the reference user models of all of the biometric subsets associated with the biometric set. Each reference user model may have a probability density function for genuine subjects and a probability density function for imposters that define a cumulative probability density function (for both for genuine subjects and imposters). The probability density functions for genuine subjects and imposters may intersect at a point of indecision and may have overlapping portions adjacent the point of indecision which define a region of indecision. The reliability of the discriminator may be characterized as a discriminator reliability score (e.g., a numeric value) that is inversely proportional to an area defined by the region of indecision. The reliability of the discriminator may be compared to the reliability of one ore more additional discriminators to determine to rank the reliabilities of the discriminators.

The analysis of the distortion scores and reference user models may utilize circumstantial data (e.g., when to use a particular subset based on the particular application used, biometrics being captured and security level desired), demographic data (e.g., variation in responses and accuracy of biometric inputs of various segments of a population), and/or statistical data (e.g., a mathematical comparison of the reliability and accuracy between a discriminator's analyses of various biometric subsets) to develop subset selection criteria for the biometric subsets. Subset selection criteria may be used to reflect situations where circumstances or demographics affect a discriminator's ability to discriminate between subjects. For example, certain sounds or words may be more pronounced in some ethnic groups than others. As an illustration, the word "zero" may be more easily pronounced by English speakers than for Japanese speakers and as a result, voice discriminators may be able to distinguish between English speakers using the word zero more easily than between Japanese speakers using the same word. As a result, the subset selection criteria may reflect this difference so that implementations of the verification system in Japanese locales treat instances of the word "zero" as less reliable than some other words. As another example, this time with respect fingerprints, it may be found that the fingerprint of the index fingers of various subjects are more distinguishable (and therefore more reliable) than the fingerprint of the middle fingers. As a result, in implementations using fingerprints, the subset selection criteria may be utilized to reflect the greater reliability of index finger fingerprints over middle finger fingerprints.

Figure 3:
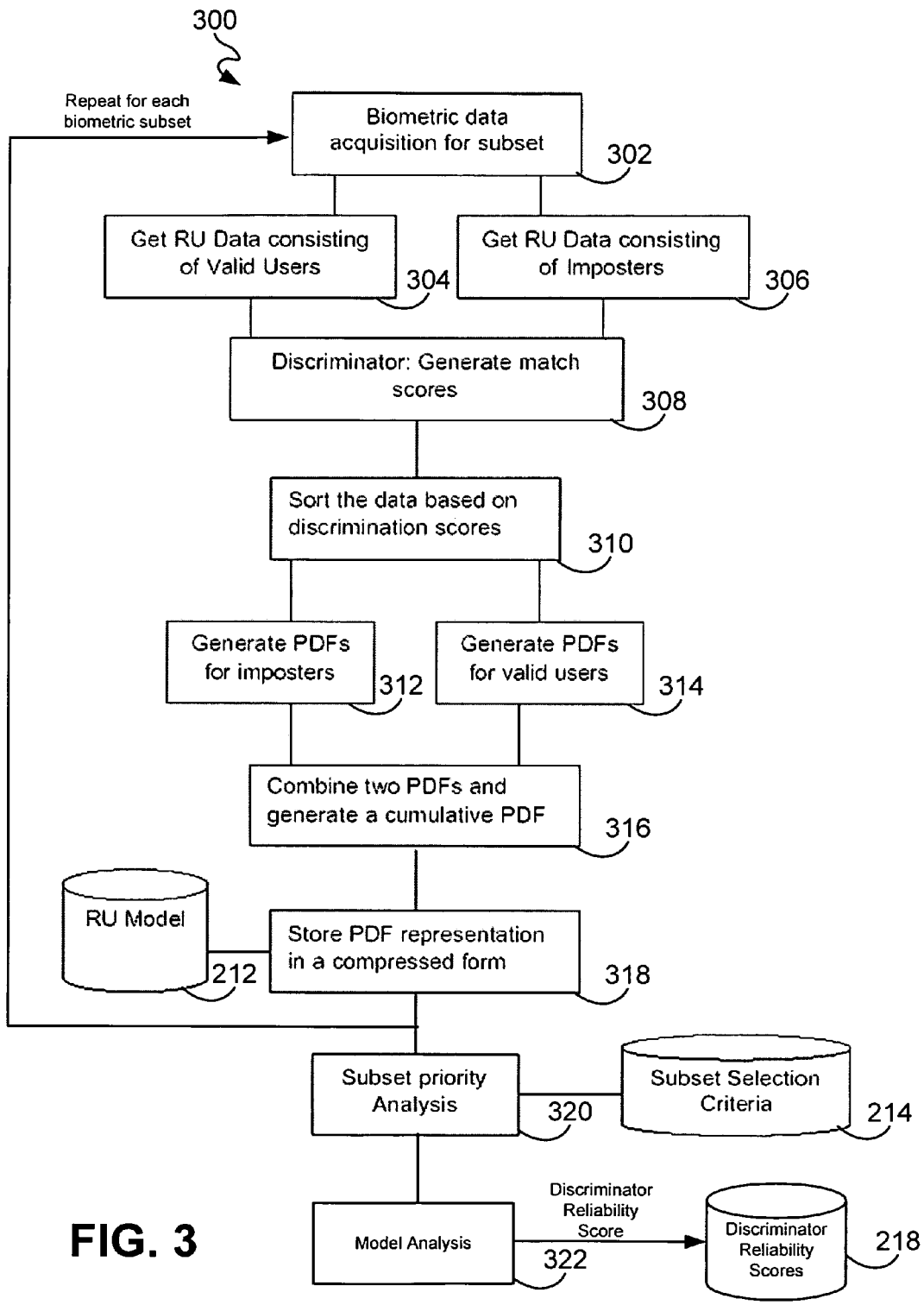
FIG. 3 is a flowchart of a training process implemented by a training engine in accordance with an exemplary embodiment of the invention.

FIG. 3 is a flowchart of an illustrative training process 300 implemented by a training engine in accordance with an exemplary embodiment of the invention. In operation 302, biometric data for a single biometric subset is acquired. Reference user data for valid users and reference user data for imposters are obtained in operations 304 and 306. In operation 308, the discriminator generates raw distortion scores (referred to herein also as "match scores"). In operation 310, the biometric data is then sorted based on the discrimination scores generated in operation 308. Separate probability density functions for the response of a single discriminator to the imposter reference user data and to the valid reference user data are generated in operations 312 and 314. In operation 316, the two probability density functions generated in operations 312 and 314 are combined to generate a cumulative probability density function (which is referred to as a reference user model). The reference user model may then be stored in a reference user module database in operation 318. As an option, a compressed form representation of the reference user model may be stored in the reference user module database in operation 318 instead of the actual reference user model.

As shown in FIG. 3, the above-discussed routine is repeated for every biometric subset so that a cumulative probability density function is generated by the associated discriminator for every biometric subset it analyzes. In operation 318, the generated cumulative probability density function for the biometric subsets that have been analyzed are also combined together to form (once all of the biometric subsets have been analyzed) a cumulative probability density function for the biometric set (this cumulative probability density function for the biometric set may also be stored in the reference user model database 212). The probability density function for the biometric is also known as the reference user model associated with the discriminator (and may be used to analyze scores generated by the discriminator during identity verification). Subset priority analysis may then be performed on the reference user model in operation 320 to obtain subset selection criteria which may be stored in a subset selection criteria database 214. Model analysis may subsequently be performed in operation 322 to obtain a discriminator reliability score based on an analysis of the reference user model for the discriminator and the subset selection criteria which may then be stored in a discriminator reliability score database 218.

Reference User Model Representation

Figure 4:
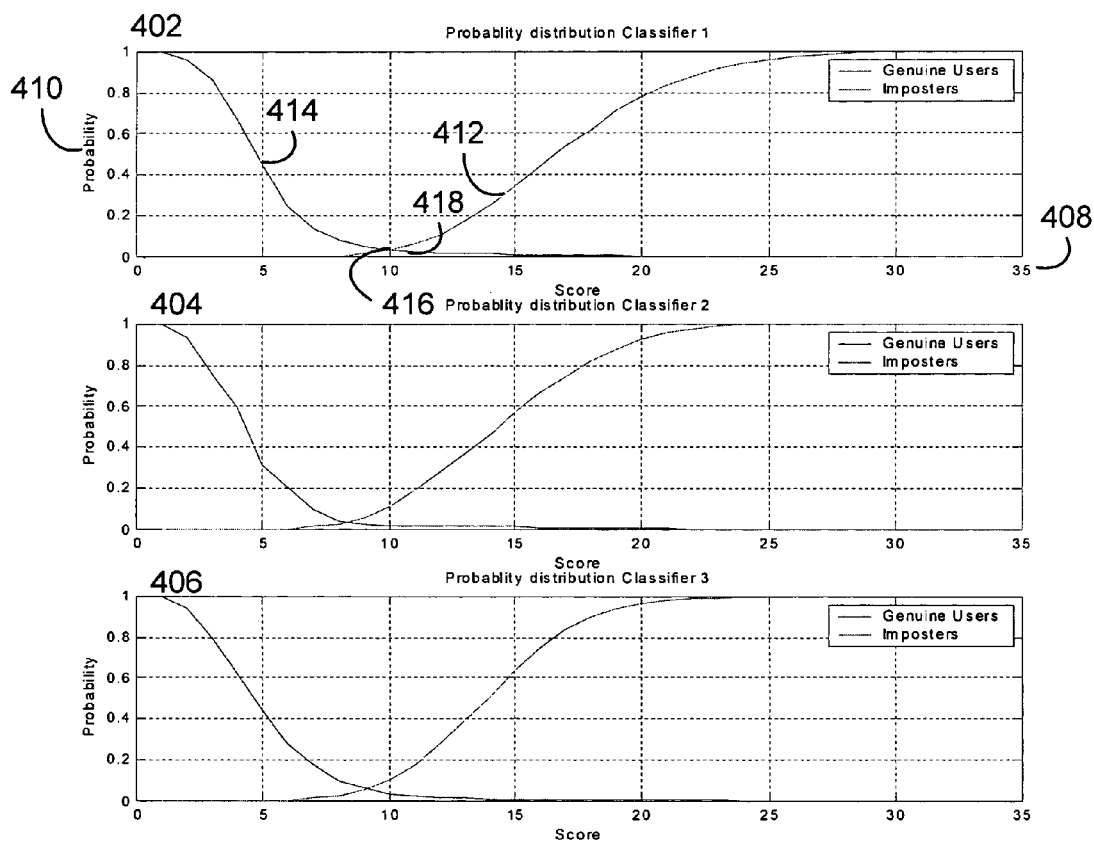
FIG. 4 presents illustrative graphical representations 402, 404, 406 of reference user models for three separate discriminators in response to a biometric subset in accordance with an exemplary embodiment.

FIG. 4 presents illustrative graphical representations 402, 404, 406 of reference user models for three separate discriminators in response to a biometric subset in accordance with an exemplary embodiment. A reference user model generated by the training engine may comprise of a probability density function for both valid users (i.e., genuine users) and imposters. This distribution may represent the response of one discriminator. One reference user model may be generated per discriminator.

In closer detail, each reference user model (e.g., each reference user model/probability density function graph 402) may have a score value axis 408 (for representing distortion score (match score) values) and a probability axis 410. Each reference user model may also include a first function 412 representing the associated discriminator's response to imposter reference user data (i.e., a probability density function for imposters) and a second function 414 representing the associated discriminator's response to genuine user reference user data (i.e., a probability density function for valid users). Together the two functions may form a cumulative probability density function. The cumulative probability density function may include an intersection point 416 (also referred to as an equal error rate (EER) point) at the point where the first and second functions 412, 414 intersect. A region 418 of the cumulative probability distribution function may also be defined as the area where there is overlap between the first and second function 412, 414 and identifies a region of indecision for the particular discriminator (also referred to as a "grey" region). As can be seen in FIG. 4, the response of each discriminator to the same biometric subset may be different. For example, in each of the graphs 402, 404, 406, the EER points 416 occur at different locations and the areas of the grey region are different.

Verification Engine

The verification engine may comprise a plurality of discriminators (referred to herein also as "classifiers"), a discriminator fusion component, and a subset fusion component. The discriminators may be capable of analyzing biometric inputs for a plurality of biometric sets of a subject in question to generate a plurality of distortion scores. Each biometric set in the biometric input may be analyzed by a separate discriminator so that a portion of the distortion scores is associated with each biometric set. A biometric set may be defined as a particular biometric feature that a discriminator analyzes. Examples of biometric sets include fingerprints, voice, iris, facial contour, skin tone, palm prints. A biometric set may comprise one or more biometric subsets. A biometric subset is a particular instance of a particular biometric set. Some examples of biometric subsets include an index fingerprint and thumb fingerprint for a fingerprint biometric set; and words, sounds, phonemes, accents for a voice biometric set.

The discriminator fusion component (referred to herein also as the "level 1 fusion component") may be capable of analyzing the distortion scores to obtain a combined confidence score for the biometric sets of the subject in question. The discriminator fusion component may perform its analysis of the distortion scores using a plurality of reference user models and a reliability ranking of the discriminators.

The subset fusion component (referred to herein also as the "level 2 fusion component") may be capable of analyzing the distortion scores generated by a discriminator for a plurality of biometric subsets utilizing subset selection criteria to generate a combined confidence score for biometric subsets of the subject in question. The verification engine may also include logic capable of determining whether to accept the subject in question as a genuine subject based on the combined confidence scores.

Figure 5:
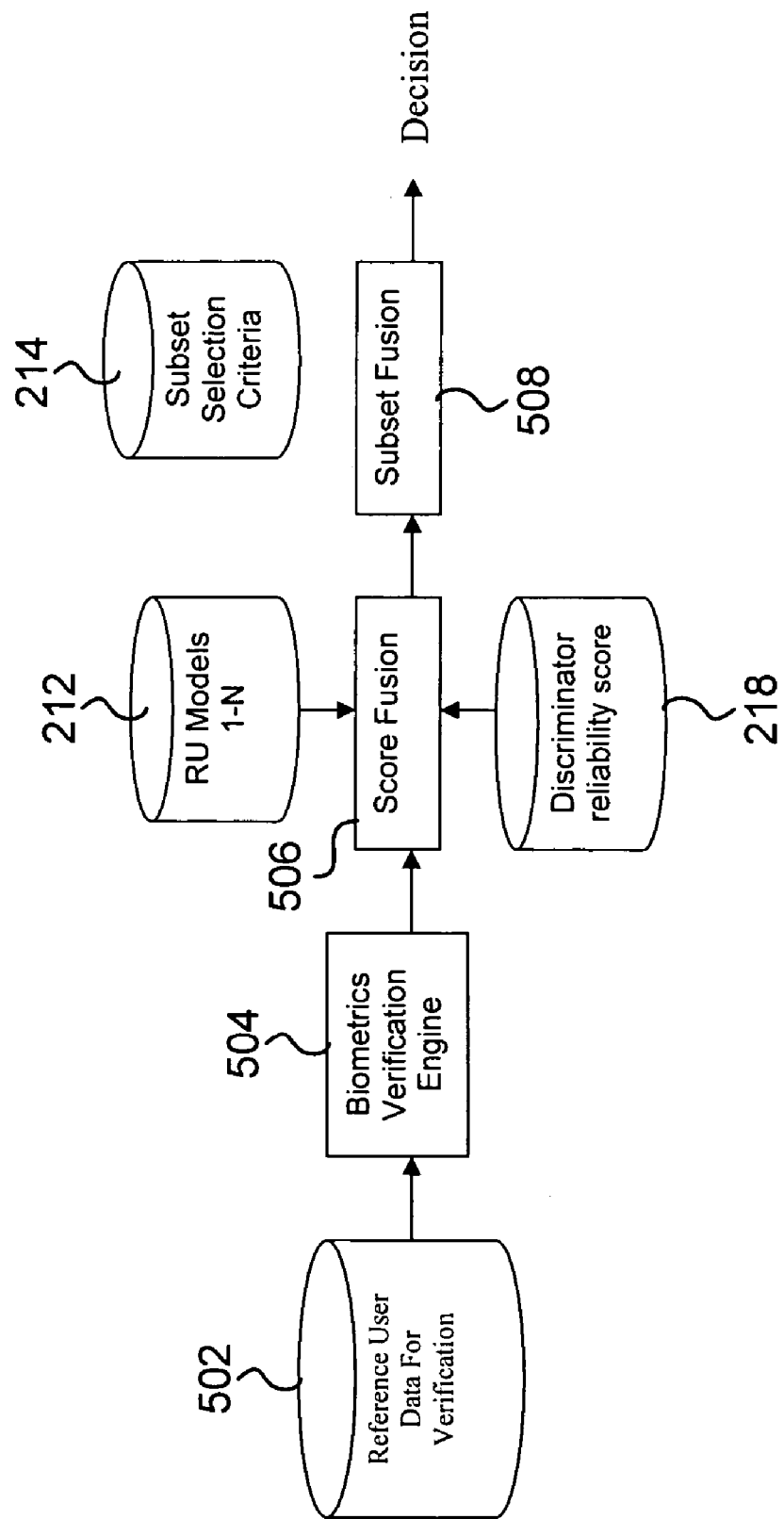
FIG. 5 is a schematic block diagram of an illustrative verification engine in accordance with an exemplary embodiment of the invention.

FIG. 5 is a schematic block diagram of an illustrative classifier verification engine in accordance with an exemplary embodiment of the invention. Reference user data for verification may be obtained from a reference user data database 502 by a biometrics verification engine 504 (which includes a plurality of discriminators). The output of the biometrics verification engine 504 may be provided to a score fusion component 506 (i.e., discriminator fusion component) coupled to the biometrics verification engine 504.

The score fusion component 506 may also be coupled to the reference user model database 212 and the discriminator reliability score database to permit the score fusion component to obtain reference user models and discriminator reliability scores. Score fusion component 506 may perform fusion on scores provided by the biometrics verification engine 504 using reference user models and discriminator reliability scores.

The score fusion component 506 may be coupled to a subset fusion component 508 for performing subset fusion on output generated by the score fusion component 506. Subset fusion component 508 may perform subset fusion on the output of the score fusion component using subset selection criteria (which may be obtained from the subset selection criteria database 214) to come to a verification decision.

In an exemplary embodiment, the classifier verification may be invoked by the following exemplary invocation mechanism:

```
For a given biometric set
    For a given biometric subset \
        Retrieve RU model for subset
        Call verifier unit with subset RU model
        Return decision or score
    end
end
```

Verification Process

Discriminator Fusion (Level One Fusion)

An identity of a subject may identified by analyzing biometric inputs of a subject in question utilizing a plurality of discriminators to generate a plurality of distortion scores. The biometric inputs may comprise biometric inputs for a plurality of biometric sets with each discriminator analyzing the biometric inputs of an associated biometric set so that each biometric set may be associated with a corresponding portion of the distortion scores. It should be understood that each discriminator is adapted for analyzing the portion of the biometric inputs associated with its unique biometric input set.

The distortion scores of the discriminators may be analyzed utilizing a plurality of reference user models and a reliability ranking of the discriminators to obtain a combined confidence score for the biometric sets of the subject in question. As previously mentioned, each discriminator has a unique reference user model associated therewith so that the analysis of its discriminator scores may be carried out using its associated reference user model. Based on the combined confidence score, a determination may be made whether to accept the subject in question as a genuine subject.

The plurality of discriminators may comprise a predetermined number of discriminators associated with a selected security level selected from a set of security levels (where each security level has a predetermined number of discriminators associated therewith). The discriminators may be utilized to analyze the biometric inputs in an order based on the reliability ranking with the most reliable discriminator analyzing the biometric inputs first and the least reliable discriminator analyzing the biometric inputs last. In on embodiment, the order in which the discriminators are selected to analyze the biometric inputs may be determined based on the discriminator reliability scores. In such an embodiment, the discriminator having the highest discriminator reliability score (i.e., the best discriminator reliability score) may analyze the biometric inputs first, the discriminator having the lowest discriminator reliability score (i.e., the worst discriminator reliability score) may analyze the biometric inputs last, and the discriminators with discriminator reliability scores between the highest and lower reliability scores may analyze the biometric inputs in the order their discriminator reliability scores are ranked between the discriminators with the highest and lowest discriminator reliability scores.

In one embodiment, the reference user models may be obtained from the reference user model database. If the reference user models are stored in a compressed form in the reference user model database, then the reference user models may be decompressed before they are used for analyzing the distortion scores. The reference user model may comprise a cumulative probability density functions for genuine subjects and for imposters that defines a point of indecision and a region of indecision adjacent the point of indecision.

In one embodiment, the analysis of the distortion scores may be performed by calculating an accept score and a reject score for the distortion score of each discriminator using the corresponding reference user model, then determining whether the accept and reject scores for any of the discriminators lie in a region of indecision of the corresponding reference user model. In one embodiment, each discriminator may analyze the biometric inputs to generate/output a pair of match scores (i.e., the accept and reject scores (also referred to has the accept and reject match scores)) based on its analysis of its associated biometric input set using its associated reference user model. The accept score may be defined along the genuine user density function at the distortion score generated by the discriminator while the reject score may be defined along the imposter density function at the distortion score. For example, in the reference user model 402, if a raw distortion score of 15 is output by the discriminator, then the calculated accept score is approximately 0.01 (i.e., slightly greater than zero) and the calculated reject score is approximately 0.35.

Next, a determination may be made as to whether the accept and reject scores lie inside or outside of the region of indecision (i.e., in the grey zone). In one embodiment, this determined may be performed by subtracting the value of the calculated reject score from the value of the calculated accept score. If the difference between the accept match score and the reject match score is less than the product of the point of intersection value and the inverse of the discriminator reliability score of the discriminator that produced the match score, then the pair of match scores is located in the region of indecision of the reference user model of the discriminator.

In one embodiment, the order in which the pairs of match scores are determined to be located in the region of indecision may be based on the discriminator reliability scores. For example, the pair of match scores of the discriminator having the highest discriminator reliability score (i.e., the best discriminator reliability score) may be analyzed first, the pair of match scores of the discriminator having the lowest discriminator reliability score (i.e., the worst discriminator reliability score) may be analyzed last, and the pairs of match scores of discriminators having the discriminator reliability scores between the highest and lower reliability scores may be analyzed last in the order their discriminator reliability scores are ranked between the match scores of the discriminators with the best and worst discriminator reliability scores.

If the accept and reject scores of the discriminator having the highest reliability ranking lies outside the region of indecision of the associated reference user model, the combined confidence score may be calculated by using the difference between the accept and reject scores of the highest reliability ranking discriminator. Similarly, if all of the pairs of march score are determined to be outside the region of indecision, then the confidence score for the pair of march score of the discriminator having the highest discriminator reliability score may be computed.

On the other hand, if a portion of accept and reject scores lie outside the regions of indecision of the corresponding reference user models, then the combined confidence score may be calculated by using the difference between the accept and reject scores of the discriminator having the highest reliability ranking that lies outside the region of indecision of the associated reference user model. For example, if the match scores calculated for the discriminators having the highest and second most highest discriminator reliability scores are determined to lie in their respective grey regions, while the match scores for the discriminator with the third highest discriminator reliability score may be utilized to compute the confidence score.

If, however, none of the accept and reject scores lie outside the regions of indecision of the corresponding reference user models, the combined confidence score may be calculated by using the difference between the accept and reject scores of the highest reliability ranking discriminator and determining whether the combined confidence score is greater than zero. As an option, a notification may be issued if none of the accept and reject scores lie outside the regions of indecision of the reference user models.

Figure 6:
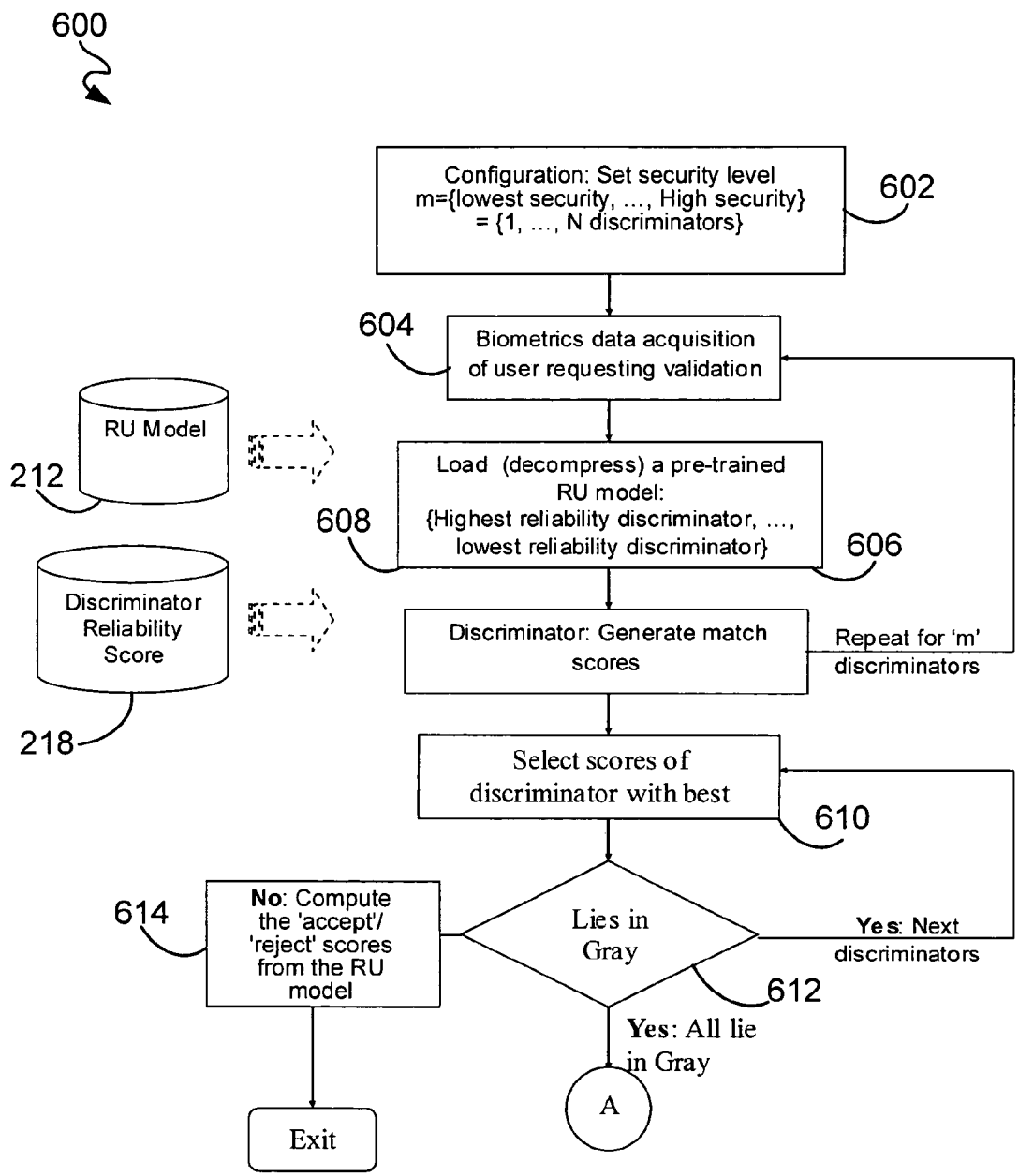
FIG. 6 is a flowchart of a verification process using discriminator fusion in accordance with an embodiment of the invention.

FIG. 6 is a flowchart of a verification process 600 implemented by a verification engine using discriminator fusion in accordance with an embodiment of the invention. In operation 602, a security level may be set as part of a configuration set up routine. The security level may be selected from a predetermined set of security levels. As an example, the security level may be selected from a set comprising a high security level, a medium security level and a low security level. Each security level may has a value "m" associated therewith. Associated with each value "m" may be a predetermined number of discriminators (e.g., 1 to N discriminators). Thus, setting the security level will set a number of discriminators as well.

In operation 604, biometric data input by a user requesting validation is received. In operation 606, a pre-trained reference user model is loaded. The pre-trained reference user model may be obtained from a database of pre-trained reference user models. The pre-trained reference user model includes a set of discriminators that may be ranked in order of their reliability (e.g., from a highest reliability discriminator (i.e., the most reliable discriminator) to a lowest reliability discriminator (i.e., the least reliable discriminator). The biometric data is then analyzed using each of the set of discriminators associated with the selected "m" value to generate a set of match scores in operation 608.

The match scores of discriminators having the best reliability are then selected in operation 110. The match score of each discriminator selected in operation 110 is then analyzed to determine if each match score lies in an ambiguous grey region (i.e., the region of indecision) (see decision 612). In an exemplary embodiment, the grey region decision 612 may be determined using the following invocation:

---
if ('accept' – 'reject' score) < (EER point * reliability weighting factor)
   Score lies in Gray region
else
   Score ok
---
Where,
Reliability weighting factor = inversely proportional to reliability of the discriminator. Value '1' is used for the most reliable. Other values will depend on the RU model of the classifier;
EER = point of intersection between the valid user and imposter cumulative PDF graphs; and
'Gray region' = represents the region of overlap between the cumulative PDFs. This is the region of indecision for the discriminator.

If an analyzed match score is found not to lie in the grey region, then accept and reject scores for the match score may be computed using the reference user model in operation 614. On the other hand, if all of the analyzed match scores are found to lie in the grey region, then path A to FIG. 7 is followed.

Figure 7:
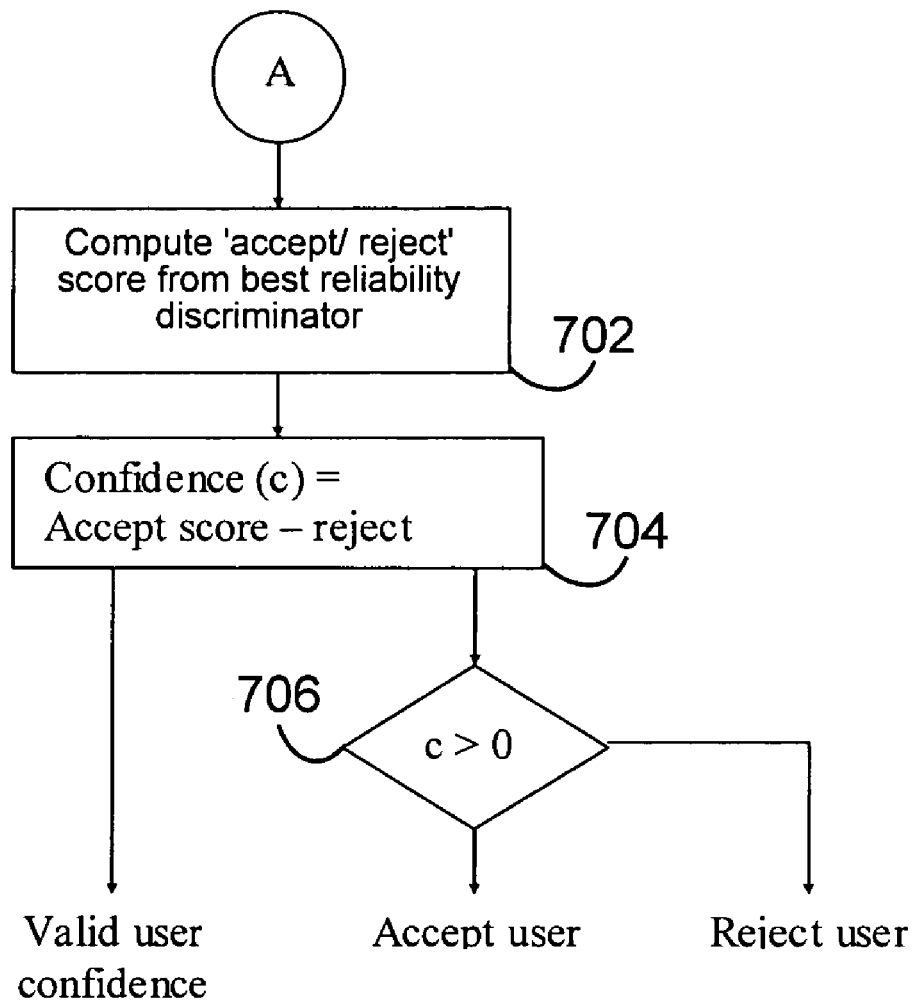
FIG. 7 is a continuation of the flowchart of the verification process set forth in FIG. 6 in accordance with an embodiment of the invention.

FIG. 7 is a continuation of the flowchart of the process 600 set forth in FIG. 6 in accordance with an embodiment of the invention. The path shown in FIG. 7 is followed if all of the analyzed match scores lies in the grey region. In operation 702, the accept and reject scores are computed for the match score having the best reliability of those match scores selected in operation 610. In operation 704, a confidence value "c" is calculated by subtracting the reject score from the accept score computed in operation 610. The confidence value may then be used as a measure of valid user confidence. In decision 706, the confidence value "c" may be utilized to determine whether to accept or reject the user. If the confidence value "c" is greater than zero, then the user is accepted. If the confidence value "c" is equal to or less than zero, the user is rejected.

Subset Fusion (Level Two Fusion)

The distortion scores of at least one discriminator may be analyzed with regard to a plurality of biometric subsets of the biometric set associated with the at least one discriminator utilizing subset selection criteria in order to combine confidence scores of the biometric subsets of the subject in question. In one embodiment, Level Two Fusion may be performed as follows. The conference scores obtained from the plurality of biometric input sets are analyzed using subset selection criteria. Subset selection criteria are applied to each of the confidence scores to determine which of the confidence scores is most desirable. A combined confidence score may then be generated based on the subset selection criteria of each confidence score.

The subset selection criteria may be derived from an analysis of reference user models in view of at least one of: circumstantial-data, demographic data, and statistical data. Some examples of subset selection criteria include: circumstantial information (e.g., when to use a particular subset based on the particular application used, biometrics being captured and security level desired) demographic information (i.e., difference in accuracy of scores between different segments of the population) and statistical information (e.g., accuracy of a score across the whole population) as to the reliability of a particular subset of a biometric.

Figure 8:
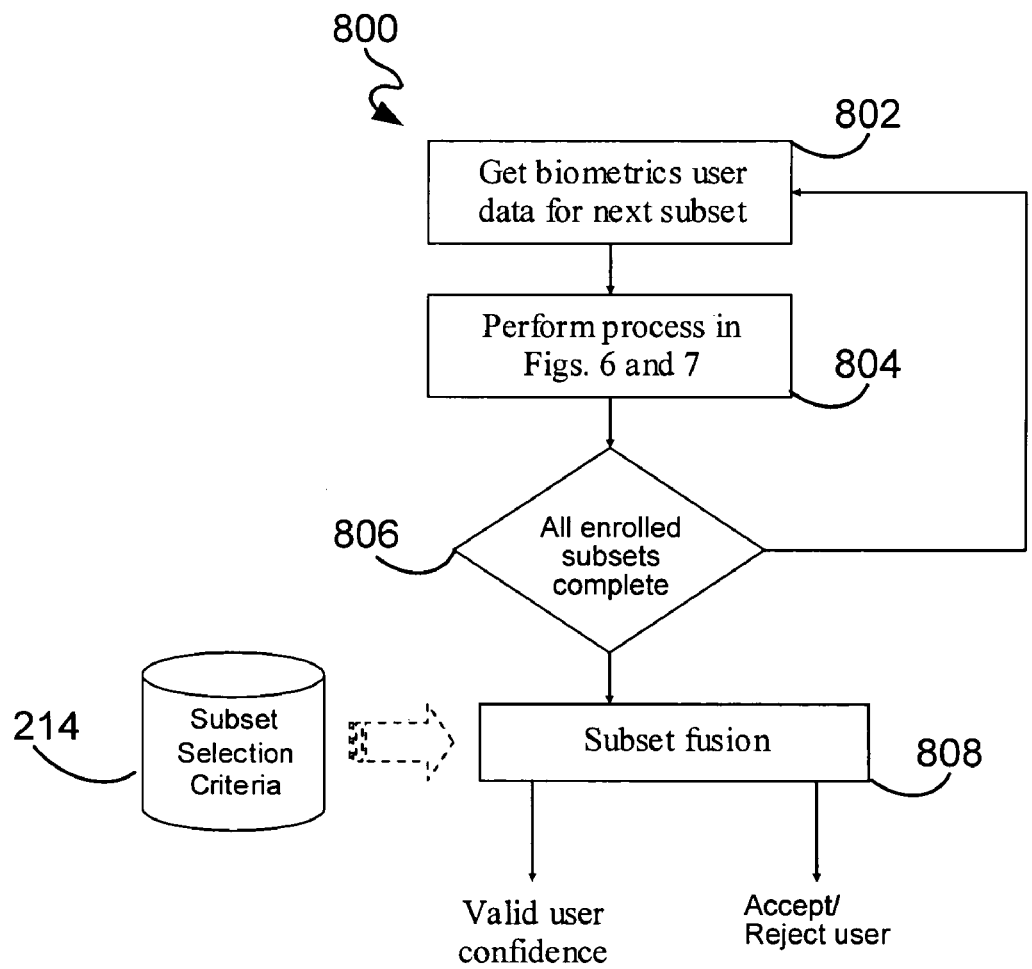
FIG. 8 is a flowchart of a verification process using subset fusion in accordance with an embodiment of the invention.

FIG. 8 is a flowchart of a verification process 800 using subset fusion for multiple biometric subsets in accordance with an embodiment of the invention. In this process, a plurality of biometric subsets are analyzed. In operation 802, biometric user data for one of subsets is obtained. In operation 804, a process of single subset verification (such as the process 600 set forth in FIGS. 6 and 7) may then be performed using the biometric data obtained in operation 802. Operations 802 and 804 are repeated for each subsets of the plurality of subsets (see "No" path of decision 806). Once the single subset verification process has been performed on all of the subsets of the plurality of subsets (see "Yes" path of decision 806), subset fusion is performed (using subset selection criteria) in operation 808 to provide a valid user confidence measure and to determine whether to accept or reject the user.

Hardware Environment

Figure 9:
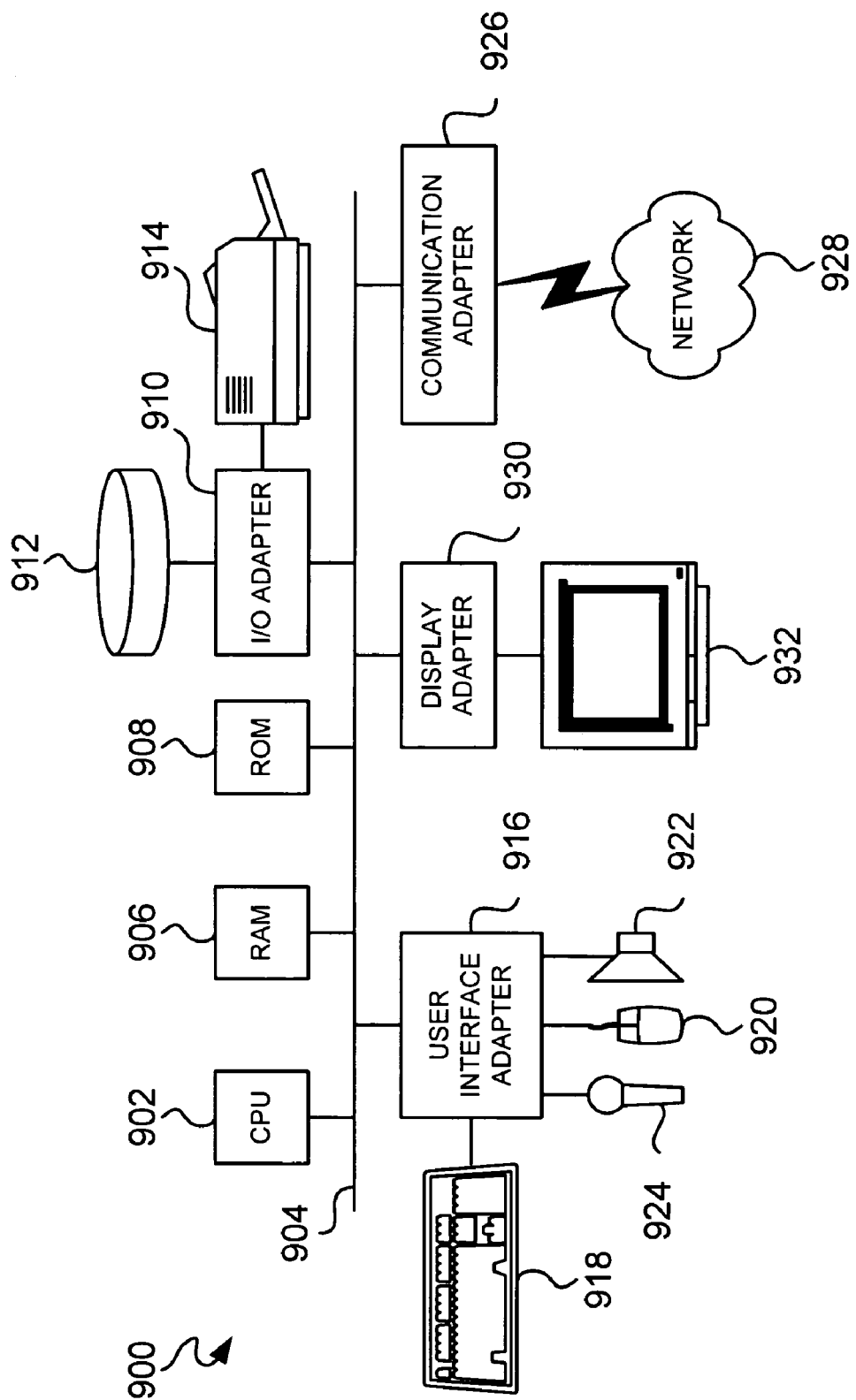
FIG. 9 is a schematic diagram of a representative hardware environment in accordance with an embodiment of the present invention.

FIG. 9 illustrates an exemplary hardware configuration of a workstation 900 having a central processing unit 902, such as a microprocessor, and a number of other units interconnected via a system bus 904. The workstation shown in FIG. 9 includes a Random Access Memory (RAM) 906, Read Only Memory (ROM) 908, an I/O adapter 910 for connecting peripheral devices such as, for example, disk storage units 912, printers 914, and the secure device 124 to the bus 904, a user interface adapter 916 for connecting various user interface devices such as, for example, a keyboard 918, a mouse 920, a speaker 922, a microphone 924, and/or other interface devices such as a touch screen or a digital camera to the bus 904, a communication adapter 926 for connecting the workstation 900 to a communication network 928 (e.g., a data processing network) and a display adapter 930 for connecting the bus 904 to a display device 932. The workstation may utilize an operating system such as, for example, the Microsoft Windows 95, NT, 98, 2000, ME, or XP Operating System (OS), the IBM OS/2 operating system, the MAC OS, Linux OS or UNIX operating system. Those skilled in the art will appreciate that the present invention may also be implemented on platforms and operating systems other than those mentioned. Embodiments of the present invention may also be implemented using computer program languages such as, for example, ActiveX, Java, C, and the C++ language and utilize object oriented programming methodology.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

In the present description, the various sub-components of each of the components may also be considered components of the system. For example, particular software modules executed on any component of the system may also be considered components of the system. One skilled in the art of computer science will easily be able to combine the software created as described with appropriate general purpose or special purpose computer hardware to create a computer system or computer sub-system embodying the method of the invention.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed:

1. A biometric verification system, comprising:
   a) a verification engine for verifying an identity of a subject, comprising:
      i) a plurality of discriminators for analyzing biometric inputs of a subject in question to generate a plurality of distortion scores, the biometric inputs comprising biometric inputs for a plurality of biometric sets, each discriminator analyzing the biometric inputs of an associated biometric set, each biometric set being associated with a corresponding portion of the distortion scores;
      ii) a discriminator fusion component for analyzing the distortion scores of the discriminators utilizing a plurality of reference user models and a reliability ranking of the discriminators to obtain a combined confidence score for the biometric sets of the subject in question;
      iii) a subset fusion component for analyzing the distortion scores of at least one discriminator for a plurality of biometric subsets of the biometric set associated with the at least one discriminator utilizing subset selection criteria to generate a combined confidence score for biometric subsets of the subject in question; and
      iv) logic for determining whether to accept the subject in question as a genuine subject based on the combined confidence scores; and
   b) a training engine for training at least one discriminator, comprising:
      i) training data for the biometric set associated with the at least one discriminator, the at least one discriminator analyzing the training data to generate a plurality of training distortion scores, the biometric set associated with the at least one discriminator comprising a plurality of biometric subsets, each of the biometric subsets having a portion of the training data associated therewith so that each biometric subset is associated with a corresponding portion of the training distortion scores;
      ii) a score analyzer for analyzing the training distortion scores to generate reference user models for each of the biometric subsets and the biometric set of the at least one discriminator;
      iii) a subset priority analyzer for analyzing the training distortion scores and reference user models generated by the score analyzer to develop subset selection criteria for the biometric subsets associated with the at least one discriminator; and
      iv) a model analyzer for analyzing the reference user models generated by the score analyzer and the subset selection criteria generated by the subset priority analyzer to characterize the reliability of the at least one discriminator.

2. The biometric verification system of claim 1, wherein each reference user model has a probability density function for genuine subjects and a probability density function for imposters that define a cumulative probability density function.

3. The biometric verification system of claim 2, wherein the probability density functions for genuine subjects and imposters intersect at a point of indecision and have overlapping portions adjacent the point of indecision which define a region of indecision.

4. A method for training a biometric verification system, comprising:
   analyzing training data for a biometric set utilizing a discriminator to generate a plurality of distortion scores, the biometric set comprising a plurality of biometric subsets, each of the biometric subsets having a portion of the training data associated therewith so that each biometric subset is associated with a corresponding portion of the distortion scores;
   analyzing the distortion scores to generate reference user models for each of the biometric subsets and the biometric set;

analyzing the distortion scores and reference user models to develop subset selection criteria for the biometric subsets; and analyzing the reference user models and the subset selection criteria to characterize the reliability of the discriminator, wherein each reference user model has a probability density function for genuine subjects and a probability density function for imposters that define a cumulative probability density function, wherein the probability density functions for genuine subjects and imposters intersect at a point of indecision and have overlapping portions adjacent the point of indecision which define a region of indecision, and wherein the reliability of the discriminator is characterized as a discriminator reliability score, the reliability score being inversely proportional to the region of indecision.

5. The method of claim 4, wherein the reference user module for a biometric set is a cumulation of the reference user models of all of the biometric subsets associated with the biometric set.

6. The method of claim 4, wherein the reliability of the discriminator is compared to the reliability of one or more additional discriminators to rank the reliabilities of the discriminators.

7. The method of claim 4, wherein the analysis of the distortion scores and reference user models utilizes circumstantial data, demographic data, and statistical data to develop subset selection criteria for the biometric subsets.

8. A method for verifying an identity of a subject, comprising:

analyzing biometric inputs of a subject in question utilizing a plurality of discriminators to generate a plurality of distortion scores, the biometric inputs comprising biometric inputs for a plurality of biometric sets, each discriminator analyzing the biometric inputs of an associated biometric set, each biometric set being associated with a corresponding portion of the distortion scores;

analyzing the distortion scores of the discriminators utilizing a plurality of reference user models and a reliability ranking of the discriminators to obtain a combined confidence score for the biometric sets of the subject in question; and determining whether to accept the subject in question as a genuine subject based on the combined confidence score, wherein the analysis of the distortion scores includes:

calculating an accept score and a reject score for the distortion score of each discriminator using the corresponding reference user model; and determining whether the accept and reject scores for any of the discriminators lie in a region of indecision of the corresponding reference user model, and wherein if the accept and reject scores of the discriminator having the highest reliability ranking lies outside the region of indecision of the associated reference user model, calculating the combined confidence score using the difference between the accept and reject scores of the highest reliability ranking discriminator.

9. The method of claim 8, further comprising analyzing the distortion scores of at least one discriminator for a plurality of biometric subsets of the biometric set associated with the at least one discriminator utilizing subset selection criteria to combine confidence scores of biometric subsets of the subject in question.

10. The method of claim 9, wherein the subset selection criteria are derived from an analysis of reference user models in view of at least one of: circumstantial data, demographic data, and statistical data.

11. The method of claim 8, wherein the discriminators are utilized in an order based on the reliability ranking.

12. The method of claim 8, wherein the reference user model comprises a cumulative probability density functions for genuine subjects and for imposters that defines a point of indecision and a region of indecision adjacent the point of indecision.

13. The method of claim 8, wherein if none of the accept and reject scores lie outside the regions of indecision of the corresponding reference user models, calculating the combined confidence score using the difference between the accept and reject scores of the highest reliability ranking discriminator and determining whether the combined confidence score is greater than zero.

14. The method of claim 8, wherein if a portion of accept and reject scores lie outside the regions of indecision of the corresponding reference user models, calculating the combined confidence score using the difference between the accept and reject scores of the discriminator having the highest reliability ranking that lies outside the region of indecision of the associated reference user model.

15. The method of claim 8, wherein the plurality of discriminators comprises a predetermined number of discriminators associated with a selected security level selected from a set of security levels.

* * * * *